United States Patent
Sip et al.

(10) Patent No.: US 8,415,821 B2
(45) Date of Patent: Apr. 9, 2013

(54) ELECTRONIC DEVICE AND ADAPTER THEREOF

(75) Inventors: Kim-Yeung Sip, Shenzhen (CN); Ming-Yue Yan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 1168 days.

(21) Appl. No.: 12/324,850

(22) Filed: Nov. 27, 2008

(65) Prior Publication Data

US 2010/0026273 A1    Feb. 4, 2010

(30) Foreign Application Priority Data

Aug. 1, 2008   (CN) .......................... 2008 1 0303311

(51) Int. Cl.
*G05B 24/02*   (2006.01)
(52) U.S. Cl. ................................. 307/1; 307/3
(58) Field of Classification Search ............ 307/1–3
See application file for complete search history.

(56) References Cited

U.S. PATENT DOCUMENTS 7,378,817 B2    5/2008   Calhoon et al.
7,999,412 B2 *  8/2011   Lanni ............................. 307/75
8,266,348 B2 *  9/2012   Trivedi .......................... 710/62
2007/0230227 A1   10/2007   Palmer

FOREIGN PATENT DOCUMENTS

JP           7143749 A     6/1995

OTHER PUBLICATIONS

Machine translation for JP7-143749A.*

* cited by examiner

*Primary Examiner* — Fritz M Fleming
(74) *Attorney, Agent, or Firm* — Altis Law Group, Inc.

(57) ABSTRACT

An adapter includes a connector, a rectifier, a communication unit, a modulating unit, and a switching unit. The connector receives an input voltage. The rectifier is capable of rectifying the input voltage into various direct current voltages. The various direct current voltages include a predetermined voltage and a desired voltage. The communication unit is configured for generating a communication signal. The modulating unit is configured for superposing the communication signal to the predetermined direct current voltage to generate a modulation signal. The communication unit is further configured for receiving a desired signal comprising information of the desired voltage from the electronic device, and controlling the rectifier to rectify the input voltage into the desired voltage and controlling the switching unit to electrically connect the rectifier to the electronic device for transmitting the desired voltage to the electronic device when receiving the desired signal.

8 Claims, 1 Drawing Sheet

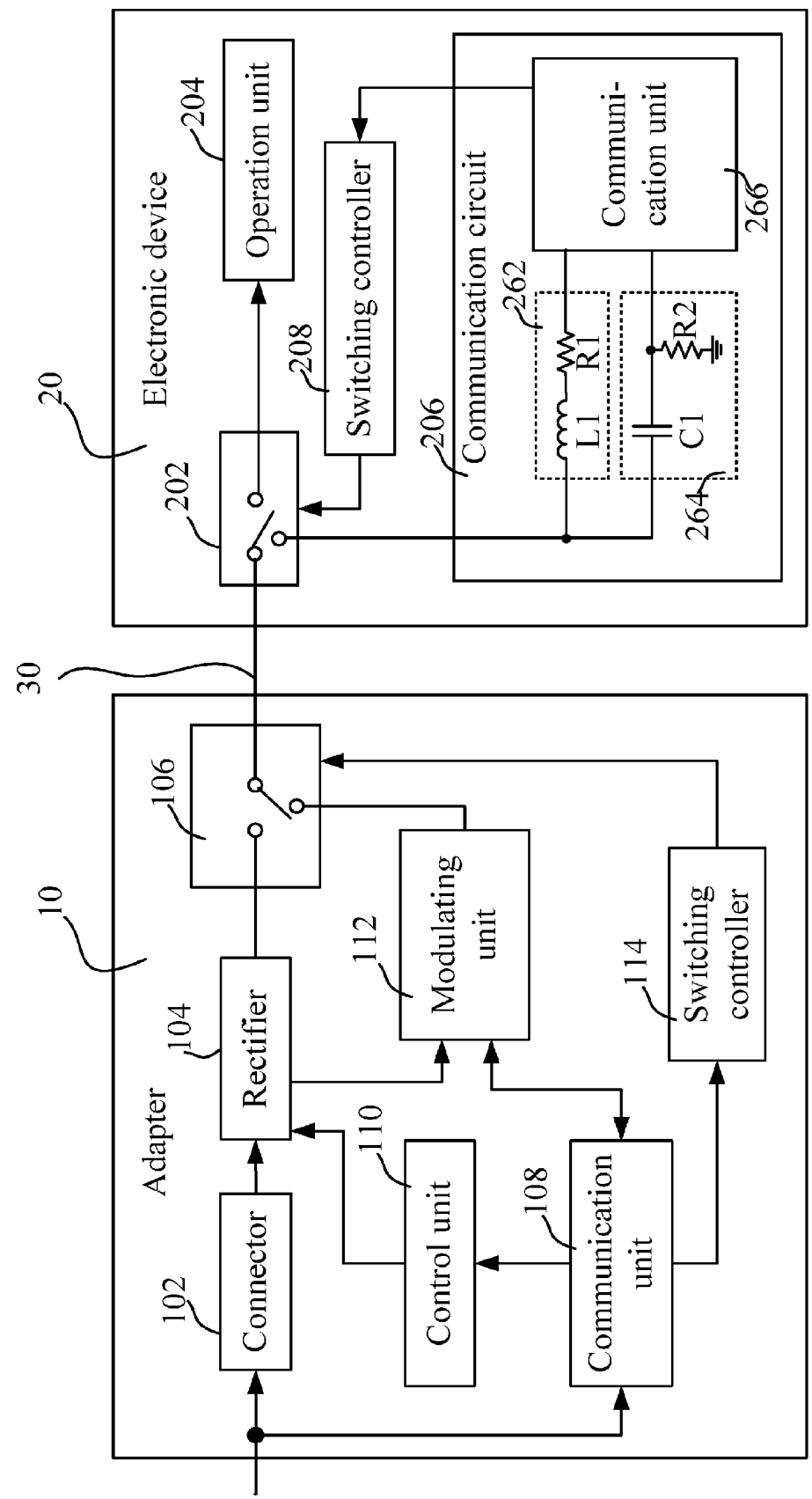

ELECTRONIC DEVICE AND ADAPTER THEREOF

BACKGROUND

1. Field of the Disclosure

Embodiments of the present disclosure relate to adapters, and particularly to a power adapter for an electronic device.

2. Description of related art

Electronic devices such as notebook computers, cellular phones, cordless telephones, mobile data terminals, etc. are now very popular. The operative or rated voltages for most of these electronic devices are direct current (DC) voltage. Power adapters may be used to convert AC voltages of the commercial power supply into the DC operative voltage. However, various adapters should be designed for various electronic devices with variable operative voltages. If a matched adapter of an electronic device is lost or damaged, the electronic device cannot be powered by other unmatched power adapters. This is an inconvenience.

Therefore, an improved electronic device and an adapter that is capable of powering various electronic devices are needed to address the aforementioned deficiency and inadequacies.

Other advantages and novel features of the present invention will become more apparent from the following detailed description of preferred embodiment when taken in conjunction with the accompanying drawings.

BRIEF DESCRIPTION OF THE DRAWINGS

The FIGURE is a system block diagram of an electronic device and an adapter in accordance with an embodiment of the present disclosure.

DETAILED DESCRIPTION OF CERTAIN INVENTIVE EMBODIMENTS

References will now be made to the drawings to describe certain inventive embodiments of the present disclosure.

Referring to the figure, an adapter 10 and an electronic device 20 connected to the adapter 10 via a wire 30 in accordance with an exemplary embodiment are illustrated. The adapter 10 is capable of selectively providing various direct current (DC) voltages based on requirements of the electronic device 20. In particular, the adapter 10 is capable of converting an input voltage into a desired DC voltage according to a desired signal from the electronic device 20. The desired DC voltage is used for powering the electronic device 20. The input voltage may be an alternating current (AC) voltage or a DC voltage.

To achieve this goal, the adapter 10 has two operation modes: a communication mode and a powering mode. In the communication mode, the adapter 10 sends a predetermined DC voltage superposing an AC communication signal to the electronic device 20, and receives the desired signal including information of the desired DC voltage from the electronic device 20. Normally, the desired DC voltage is a rated voltage of the electronic device 20. The adapter 10 then operates in the powering mode to generate the desired DC voltage and powering the electronic device 10 with the desired DC voltage.

The adapter 10 may include a connector 102, a rectifier 104, a switching unit 106, a communication unit 108, a control unit 110, a modulating unit 112, and a switching controller 114.

The connector 102 is used for receiving and transmitting the input voltage to the rectifier 104. The connector 102 may be a power plug that is capable of connecting to the commercial power system to receive electric power.

The rectifier 104 is capable of rectifying the input voltage into various DC voltages within a predetermined range (from 3 Volts to 22 Volts, for example) under control of the control unit 110. The rectifier 104 may be a switching rectifier. The control unit 110 may be a pulse-width modulator, which outputs a pulse signal under control of the communication unit 108. The pulse signal is used for controlling a ratio of a switch-on time and a switch-off time of a switch (not shown) of the switching rectifier 104, thus, adjusting a value of the DC voltage outputted by the rectifier 104.

In this embodiment, the rectifier 104 rectifies the input voltage into the predetermined DC voltage in the communication mode. The predetermined DC voltage is the lowest voltage within the predetermined range (3 Volts for example), with little or no risk of damaging any electronic devices with different voltage requirements. In the powering mode, the rectifier 104 rectifies the input voltage into the desired DC voltage for powering the electronic device 20.

The switching unit 106 is controllable for switching the adapter 10 to operation between the communication mode and the powering mode. In particular, the switching unit 106 electrically connects the modulating unit 112 to the electronic device 20 in the communication mode, and electrically connects the rectifier 104 to the electronic device 20 in the powering mode, so as to transmit the desired DC voltage to the electronic device 20. In this embodiment, the switching unit 106 normally connects the modulating unit 112 to the electronic device 20. Once receiving a switching signal (a high voltage signal for example) from the switching controller 114, the switching unit 106 connects the rectifier 104 to the electronic device 20.

The communication unit 108 is configured for controlling the operation mode of the adapter 10. In operation, the communication unit 108 may generate a first control signal and send the first control signal to the control unit 110 when the adapter 10 is powered on. The control unit 110 generates a first rectifier signal to control the rectifier 104 to generate the predetermined DC voltage. The communication unit 108 further generates and sends the AC communication signal to the modulating unit 112. As a result, the adapter 10 operates in the communication mode. The AC communication signal is configured for informing the electronic device 20 to feed back the desired signal. The AC communication signal may have a first predetermined frequency used for informing the electronic device 20 to feed back the desired signal.

The modulating unit 112 is configured for superposing or modulating the AC communication signal to the predetermined DC voltage to generate a modulation signal, and sending the modulation signal to the electronic device 20 via the switching unit 106. The modulating unit 112 is further configured for receiving the desired signal including the information of the desired DC voltage from the electronic device 20 via the switching unit 106, and sending the information of the desired DC voltage to the communication unit 108.

When receiving the information of the desired DC voltage and determining that the desired DC voltage is within the predetermined range, the communication unit 108 may generate and send a second control signal including the information of the desired DC voltage to the control unit 110, and the switching signal to the switching controller 114. The control unit 110 controls the rectifier 104 to generate the desired DC voltage according to the second control signal. The switching controller 114 controls the switching unit 106 to connect the rectifier 104 to the electronic device 20. As a result, the adapter 10 starts operating in the powering mode to supply the desired DC voltage to the electronic device 20. When the communication unit 108 determines that the rated voltage is outside the predetermined range, the communication unit 108 may output an audible or visual alert signal. The desired signal may have a second predetermined frequency representing the information of the desired DC voltage. The communication unit 108 may determine the desired voltage according to the second predetermined frequency. The desired signal may also have a third predetermined frequency representing the information of a rated current of the electronic device 20.

The electronic device 20 may include a switching unit 202, an operation unit 204, a communication circuit 206, and a switching controller 208.

Similar to the adapter 10, the electronic device 20 has two operation modes: a communication mode and a powering mode. The switching unit 202 is configured for electrically connecting the adapter 10 to the communication circuit 206 for transmitting the modulation signal in the communication mode, and electrically connect the adapter 10 to the operation unit 204 for transmitting the desired DC voltage in the powering mode. In this embodiment, the switching unit 202 normally connects the adapter 10 to the communication circuit 206.

The communication circuit 206 is configured for generating the desired signal including the information of the desired DC voltage when receiving the modulation signal, and sending the desired signal to the adapter 10 via the switching unit 202. In this embodiment, the desired signal is an alternating signal. The communication circuit 206 is further configured for generating a third control signal after the desired signal is sent to the adapter 10, and sending the third control signal to switching controller 208. In response to the third control signal, the switching controller 208 generates a switching signal (a high voltage for example) for controlling the switching unit 202 to connect the adapter 10 to the operation unit 204, thus, the operation unit 204 is powered with the desired DC voltage.

The communication circuit 206 may include a filter circuit 262, a signal acquisition circuit 264, and a communication unit 266. The filter circuit 262 is configured for receiving the modulation signal, filtering out the AC communication signal from the modulation signal, and sending the predetermined DC voltage to power the communication unit 266. In this embodiment, the filter circuit 262 may include an inductor L1 and a resistor R1. The inductor L1 and the resistor R1 are connected in series between the switching unit 202 and the communication unit 266.

The signal acquisition circuit 264 is configured for extracting the AC communication signal from the modulation signal, sending the AC communication signal to the communication unit 266. The AC communication signal is configured for informing the electronic device 20 to feed back the desired DC voltage. In response to the AC communication signal, the communication unit 266 generates the desired signal including the information of the desired DC voltage, and sends the desired signal to the adapter 10 via the switching unit 202 and the signal acquisition circuit 264. As a result, the adapter 10 obtains the desired voltage of the electronic device 20. The communication unit 266 is further capable of generating the third control signal after the desired signal is sent.

In this embodiment, the signal acquisition circuit 264 may include a capacitor C1 and a resistor R2. The capacitor C1 is connected between the switching unit 202 and the communication unit 266. A terminal of the resistor R2 is connected to a connection node between the capacitor C1 and the communication unit 266. The other terminal of the resistor R2 is grounded.

To sum up, a communication link is established between the adapter 10 and the electronic device 20 for determining whether a desired voltage is available for powering the electronic device 20. When the desired voltage is available, the adapter 10 is capable of converting the input voltage into the desired DC voltage according to the desired signal from the electronic device 20. Therefore, the adapter 10 is suitable for a plurality of electronic devices that are capable of communicating with the adapter 10. It is very convenient.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An adapter, comprising:
    a connector for receiving an input voltage;
    a rectifier capable of rectifying the input voltage into various direct current voltages, the various direct current voltages comprising a predetermined voltage and a desired voltage;
    a communication unit for generating a communication signal for communicating with an electronic device;
    a modulating unit for superposing the communication signal to the predetermined direct current voltage to generate a modulation signal;
    a switching unit for electrically connecting the modulating unit to the electronic device for transmitting the modulation signal to the electronic device, and electrically connecting the rectifier to the electronic device;
    a control unit connected between the communication unit and the rectifier; and
    a switching controller connected between the communication unit and the switching unit;
    wherein the modulating unit is further configured for receiving a desired signal comprising information of the desired voltage from the electronic device, and sending the information of the desired voltage to the communication unit, the communication unit is further configured for generating and sending a control signal including the information of the desired voltage to the control unit, and generating and sending a switching signal to the switching controller, the control unit is configured for controlling the rectifier to rectify the input voltage into the desired voltage according to the control signal, and the switching controller is configured for controlling the switching unit to electrically connect the rectifier to the electronic device.

2. The adapter as claimed in claim 1, wherein the various direct current voltages are within a predetermined range.

3. The adapter as claimed in claim 2, wherein the predetermined voltage is the lowest voltage within the predetermined range.

4. The adapter as claimed in claim 1, wherein the desired voltage is a rated voltage of the electronic device.

5. The adapter as claimed in claim 1, wherein the switching unit normally electrically connects the modulating unit to the electronic device.

6. The adapter as claimed in claim 1, wherein the communication signal is an alternating signal.

7. An adapter having two operation modes, a communication mode and a powering mode, the adapter comprising:
- a connector for receiving an input voltage;
- a rectifier for rectifying the input voltage into a predetermined direct current voltage in the communication mode, and a desired voltage in the powering mode;
- a communication unit for generating a communication signal for communicating with an electronic device;
- a modulating unit for superposing the communication signal to the predetermined direct current voltage to generate a modulation signal;
- a switching unit for electrically connecting the modulating unit to the electronic device for transmitting the modulation signal to the electronic device and transmitting a desired signal comprising information of the desired voltage from the electronic device to the communication unit via the modulating unit in the communication mode, and for electrically connecting the rectifier to the electronic device for transmitting the desired voltage to the electronic device in the powering mode; and
- a control unit connected between the communication unit and the rectifier, the control unit is configured for controlling rectifying operations of the rectifier under control of the communication unit; and
- a switching controller connected between the communication unit and the switching unit, the switching controller is configured for switching the switching unit under control of the communication unit.

8. The adapter as claimed in claim 7, wherein the switching unit normally electrically connects the modulating unit to the electronic device.

* * * * *